(12) United States Patent
McCauley

(10) Patent No.: US 6,263,392 B1
(45) Date of Patent: Jul. 17, 2001

(54) METHOD AND APPARATUS FOR INTERFACING MULTIPLE PERIPHERAL DEVICES TO A HOST COMPUTER

(76) Inventor: Jack J. McCauley, 1 Jillian Way, Danville, CA (US) 94506

(*) Notice: Subject to any disclaimer, the term of this patent is extended or adjusted under 35 U.S.C. 154(b) by 0 days.

(21) Appl. No.: 09/225,160

(22) Filed: Jan. 4, 1999

(51) Int. Cl.[7] .................................................. G06F 13/00
(52) U.S. Cl. .............................. 710/129; 710/63; 463/25; 463/42
(58) Field of Search .................................. 710/129, 126, 710/63; 173/200; 463/25, 26, 27, 40, 41, 42; 235/380, 381

(56) References Cited

U.S. PATENT DOCUMENTS

| | | | |
|---|---|---|---|
| 5,702,303 | * 12/1997 | Takemoto et al. | 463/27 |
| 5,743,533 | * 4/1998 | Wiles et al. | 280/5.507 |
| 5,935,224 | * 8/1999 | Svancarek et al. | 710/63 |
| 5,991,546 | * 11/1999 | Chan et al. | 395/882 |
| 6,038,320 | * 3/2000 | Miller | 380/44 |

* cited by examiner

Primary Examiner—Robert Beausoleil
Assistant Examiner—X. Chung-Trans
(74) Attorney, Agent, or Firm—Patrick Reilly (57) ABSTRACT

A method and an apparatus to interface multiple peripheral devices to a host computer is provided. An interface control module located in a multi-user computer game arcade system interfaces a host computer via a Universal Serial Bus (USB) to one or more joysticks, steering wheels, trackballs, coin op/bill counters, credit card readers and/or optical guns. A set of connectors allows the game builder or player to interface a variety of input peripherals to the interface control module. The interface control module recognizes the HID type of the input peripheral by the type of the selected connector, and then provides HD reports that describe each input device to the HID compliant software system of the host computer. The interface control module may support 127 HID peripherals. A watchdog function of the interface control module detects host computer malfunctions and crashes, and boots the host computer while retaining coin credit input data received proximate to and during the malfunction and recovery.

13 Claims, 5 Drawing Sheets

METHOD AND APPARATUS FOR INTERFACING MULTIPLE PERIPHERAL DEVICES TO A HOST COMPUTER

FIELD OF INVENTION

The present invention relates to the interfacing of host computers with peripheral devices. More particularly, the present invention relates to the design and use of electronic interfaces that transmit information to and/or from peripheral devices to a host computer within the rules and specifications of predetermined formats.

BACKGROUND OF INVENTION

The computer industry continuously strives to offer improved computer systems at lower costs in today's environment of the "never satisfied customer". The history of the personal computer, or PC, is largely defined by periods of punctuated evolution where the introduction of a newer, more powerful PC design rapidly obsoletes another recent though earlier PC version or generation. In these regards, simplicity in computer system use, reduction in computer hardware costs and decreases in run-time electrical power consumption are all three meaningful areas of improvement and offer potentials of competitive advantage in the computer marketplace.

For their part, the software developers of the computer industry have fairly continuously striven to develop significantly more powerful and elegant operating systems and software utilities whereby the burden of functional complexity of the computer system is relieved from the computer system hardware and is accepted by the computer system software.

In particular, certain PC software operating systems, such as Microsoft's NT 5.0 and Windows 98, and Apple's OS 8.0, substantively incorporate and/or conform to individual principles, concepts and/or specifications found in the Human Interface Device standard, as described in "The Device Class Definition for Human Interface Devices, Firmware Specification", Version 1.0—Final, USB Implementer's Forum, 1997. The Human Interface Devices standard, or HID, teaches that certain host computers and PC's may be programmed to accept and/or transmit formatted self-descriptive information packets, or HID report descriptors, and peripheral state data, or HID reports, to and/or from HID compliant peripheral input, output and bi-directional devices. The use of predetermined formats for communication and control between the host computer and the peripheral devices is supports the vigorous commercial and consumer implementation of plug-and-play computer system modules, whereby a computer user may purchase a HID device with a high degree of confidence that the newly acquired HID device will be easily integrated into his or her computing system.

Many recent conventional art, multi-user PC game system designs include a communications traffic hub circuit, or hub, connected to a host PC via a Universal Serial Bus, or USB. The hub may in turn be in communication with up to 126 HID peripherals. Each HID device includes a dedicated micro controller in combination with an input, an output or a bi-directional device. Typical prior art designs provide HID compliant input devices by combining the micro controller circuit with a simple peripheral device, such as a joystick or a lamp. The micro controller circuit is specifically designed to generate HID report descriptors and HID reports formatted in accordance with the HID formatting that corresponds to the peripheral device, wherein the HID report descriptor may inform a HID compliant host computer about the type and internal features of the relevant input, output or bi-directional device via HID report descriptors. Additionally, data reporting the instantaneous state, or desired state, of the peripheral device is communicated to and/from the micro controller and the host PC by means of preformatted HID reports.

Conventional art teaches that each peripheral device requires a micro-controller circuit to interface the peripheral to the hub. Yet this interface design method is costly in hardware and has uneconomical electrical power requirements. The potential advantages of relying solely upon 0.5 Amp power transmission capability of the Universal Serial Bus standard in certain PC game arcade systems is reduced in the prior art systems that require more than four HID devices. Furthermore, the prior art fails to more fully exploit the opportunity for hardware cost reduction made possible by the increasing sophistication and capabilities of conventional computer operating systems, such as Windows 98 or NT 5.0.

Computer arcade game systems could be made more effective by the cost-effective inclusion of several additional computer system operational features, such as (1) allowing a low-cost HID device to provide alphanumeric character transmission to the host computer by software emulation of a keyboard, (2) insuring that a particular game software will run only with, or run optimally only with, particular HID devices, where the HID devices are identified by a serial number or a software key, (3) storing a credit counter in defense against losing game credits during a game system malfunction, and (4) providing a watchdog function that resets the host PC when a host PC crash or malfunction is empirically indicated.

There is, therefore, a long felt need to increase the energy efficiency, and reduce the cost and complexity of computer interface hardware designs that incorporate multiple input, output and/or bidirectional peripheral devices.

OBJECTS OF THE INVENTION

It is therefore an object of the present invention to provide a method of interfacing peripheral devices to a host computer via a communications interface bus and an interface control module.

It is another object of the present invention to provide an interface control module that receives data from at least one analog and/or digital peripheral devices, and where the interface control module processes and formats the received data, and the interface control module then transmits the formatted data to the host computer.

It is a further object of the present invention to reduce the power requirements and consumption of a computer system with a plurality of peripheral devices and that may permit that some or all of electrical power of the interface control module and the peripheral devices to be delivered via a communications and power interface, such as a USB interface or other suitable communications and power bus interface known in the art.

It is yet a further object of the present invention to provide a method of interface that reduces the cost of interfacing a plurality of peripheral devices to a host computer.

SUMMARY OF INVENTION

The present invention provides an improved method of interfacing design, and an interfacing apparatus, that allows a plurality of peripheral devices to communicate with a host computer. A preferred embodiment of the method of the present invention includes the reading of peripheral state information of certain peripheral devices by an interface control module, where the peripheral state information may be indicative of an instantaneous mechanical position of an analog potentiometer and/or indicative of an alternately manually depressed and released button. The interface control module transmits formatted data packets, such as HID report descriptors, and formatted signal data, such as HID reports, to the host computer via a communications interface, or bus. The HID report descriptors are substantively formatted according to the HID standard and the archetype and/or structure of the corresponding peripheral device. Each HID report is formatted substantively in accordance with the HID standard and a reading of the state information as read from a specific peripheral device.

A system software of the host computer interprets the significance of the formatted data packets and the formatted signal data according to a preestablished communications standard, such as the HID standard, or another suitable knowledge based data communications formatting standard or technique known in the art.

Sufficient electrical power to run the interface control module and the plurality of peripheral devices may be provided via a USB bus, or over another suitable communications and power bus known in the art, to the interface control module, and then from the interface control module to the peripheral devices.

An interpretive software module of the host computer system software contains and/or uses a library of pre-defined peripheral device archetypes, data structure building rules and signal handling protocols. The data structure building rules direct the construction of peripheral device-specific data structures. The construction of each peripheral device-specific data structure is determined by an interpretation of the system software of a self-descriptive formatted data packet, such as a HID report descriptor, that describes a particular peripheral device. The formatted self-descriptive data packet relates the personality or archetype of the originating peripheral device to a particular archetype model structure contained in the software module, and typically further describes individual design elements, and the nature and relatedness of the elements, of the peripheral device within the context of the referenced archetype model. The interpretive software module may then employ the data structure building rules to construct a device-specific data structure upon the bases of the pre-defined form of the designated archetype and the specific description, if applicable, of the individual design elements of the selected peripheral device.

Similarly signal data generated by the peripheral device is processed by the interface control module into accordance with a predetermined format signal data and/or in light of the archetype and structure of the originating peripheral device. The formatted signal data is then communicated over the signal bus, received by the host computer, and interpreted by the system software of the host computer via the applicable signal data interpretation protocols, and in view of the particular device-specific data structure that corresponds to the relevant and previously received self-descriptive formatted data packet.

Certain preferred embodiments communicate self-descriptive formatted data packets substantively formatted in accordance with the Human Interface Device (HID) standard to the host computer over a Universal Serial Bus.

In certain preferred embodiments that are substantively HID compliant, an operating system of the interface control module is preformatted to provide appropriate HID report descriptors and HID reports to the host computer. The interface control module operating system is pre-programmed to recognize and expect that a particular HID class or type of peripheral device will be connected to a particular connector of the interface control module. A HID report descriptor corresponding to a HID peripheral archetype, that relates to the expected HID peripheral class or type, is then created and transmitted to the host computer during an enumeration process cycle of the interface control module. Appropriately formatted HID reports are thereafter generated by the interface control module, and transmitted to the host computer, on the basis of the HID class or type of the peripheral device and the instantaneous state data read from the peripheral device by the interface control module.

Certain alternate preferred embodiments of the present invention optionally include a game system safe guarding, or watchdog function, wherein the interface control module monitors the communication activities and messaging of the host computer on the USB to detect certain substantive malfunctions or a crash of the host computer. Towards this end, the interface control module monitors the bus interface activity between the host computer and the control module. The interface controller module may include an electrical transmission cable, pathway or other means, or other suitable communications or signal pathway, cable or means known in the art, to a reset input line of the host computer. When the control interface module detects behavior, or omissions of behavior, that may be indicative of a host system certain substantive malfunctions or errant behavior of the host computer, the interface control module will initiate a reset the host computer. It is hereby emphasized that errant behavior may describe omissions, where signals and messages that are typically sent by the host computer over the bus interface are not detected within pre-established conditions or time periods by the interface control module.

In certain still alternate preferred embodiments of the present invention, the interface control module optionally contains an identifying serial number or authorization key in a memory sector. The host computer may thereby poll the interface control module to determine the serial number of the interface control module. This optional capability allows the host computer to confirm that a pre-authorized interface control module is being used, or to determine that an unauthorized interface is being attempted. The host computer may thereby selectively interact with only pre-authorized interface control modules. The optional implementation of interface control module serial number designation and/or authorization key generation, recording, transmission and/or confirmation may thereby limit, discourage or prevent the unauthorized use of a computer game software or other computer application software.

In certain other preferred embodiments of the present invention credit input information is optionally recorded by the interface control module. This memory function may prevent the loss of coin input, financial currency input and/or credit input information due to host systems malfunctions and/or by recoveries from malfunction.

In certain yet alternate preferred embodiments of the present invention the interface control module formats input data from a peripheral device so that the host computer reads views the peripheral device as including a keyboard, and accepts data and signals from this device, and as formatted and transmitted by the interface control module, as key board characters or key strokes. This optional functionality allows a computer system designer to boot or reboot the host computer operating system while avoiding the expense of providing a keyboard device.

DETAILED DESCRIPTION OF A PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
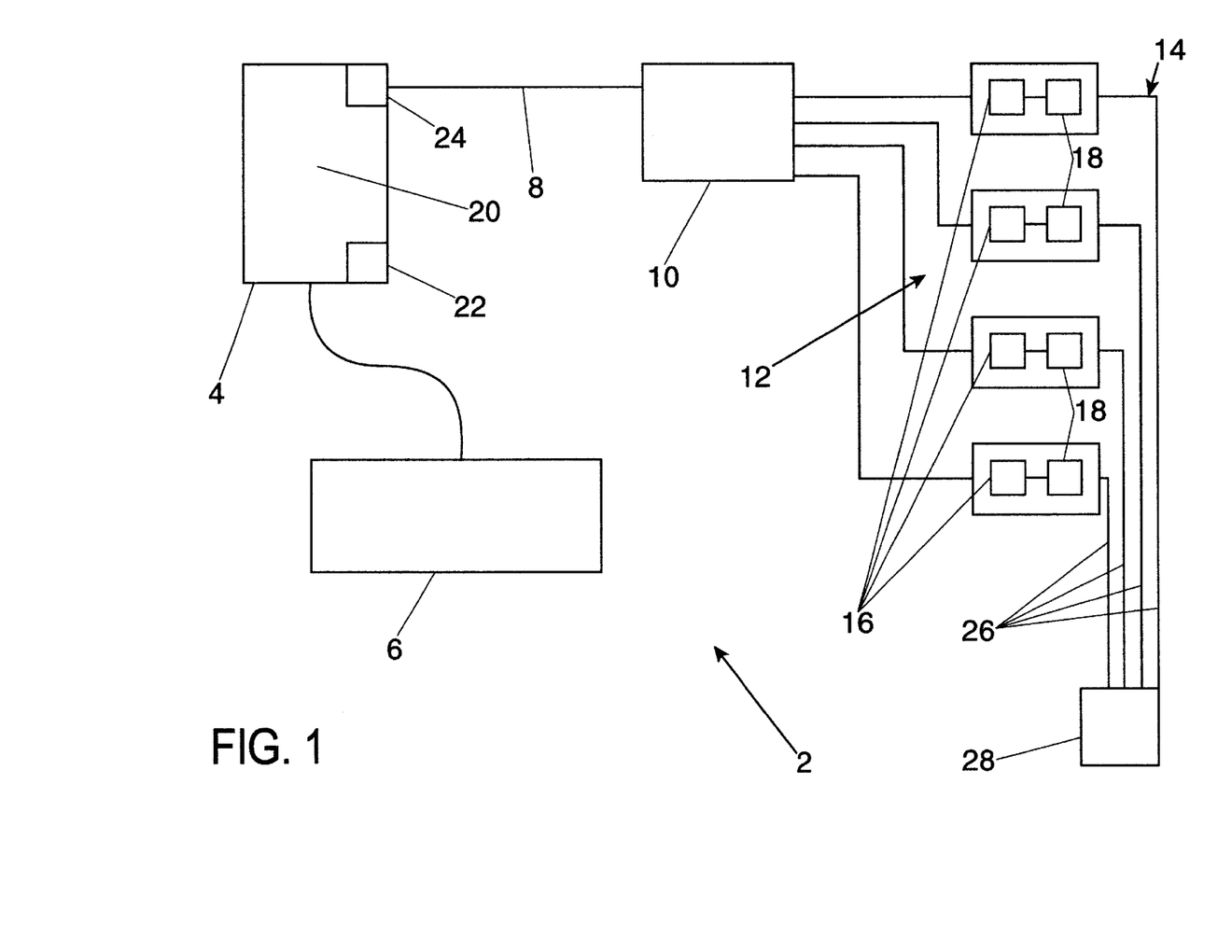
FIG. 1 is a prior art computer game arcade system using a hub.

Referring now to FIG. 1, a prior art PC game arcade system 2 includes a host PC 4, a keyboard 6, a USB cable 8, or USB 8, a hub 10, a plurality of conventional HID compliant peripheral devices 12 and a power supply network 14. Each HID compliant peripheral device 12, or conventional HID compliant device 12, includes a dedicated micro controller 16 and a peripheral device 18. The host computer 4 includes and employs a Microsoft NT 5.0 operating system software 20, a reset signal input 22 and a USB port 24. The NT 5.0 software contains a DirectX multimedia software module and substantively complies with certain HID specifications, as found in "The Device Class Definition for Human Interface Devices, Firmware Specification", Version 1.0—Final, USB Implementer's Forum, 1997.

The keyboard 6 is interfaced to the host PC 4 and is variously used by a system operator, not shown, to run the system 2, input alphanumeric data into the host PC 4, and to boot, restore or reboot the host PC 4 to operation. The USB cable 8 provides a transmission means for electrical signals and power to and from the USB port 24 of the host computer 4 and the hub 10. Each of the conventional HID devices 12 are in turn electrically connected to the hub 10.

The hub 10 accepts HID report descriptors and HID reports from the micro-controllers 16. The hub 10 then transmits the HID report descriptors and HID reports to the USB port of the host PC 4 via the USB cable. The host computer 4 then interprets the HID report descriptors and HID reports received from the hub 10 in accordance with the HID standard. The hub 10 may support up to 126 peripheral devices.

The prior art computer game arcade system 2 requires the inclusion of the keyboard 6, the hub 10 and the plurality of micro controllers 16 in order to provide a HID compliant computer game arcade system 2, where each micro controller 16 may require a separate electrical power transmission line 26 from an electrical power supply 28 of the power supply network 14.

Figure 2:
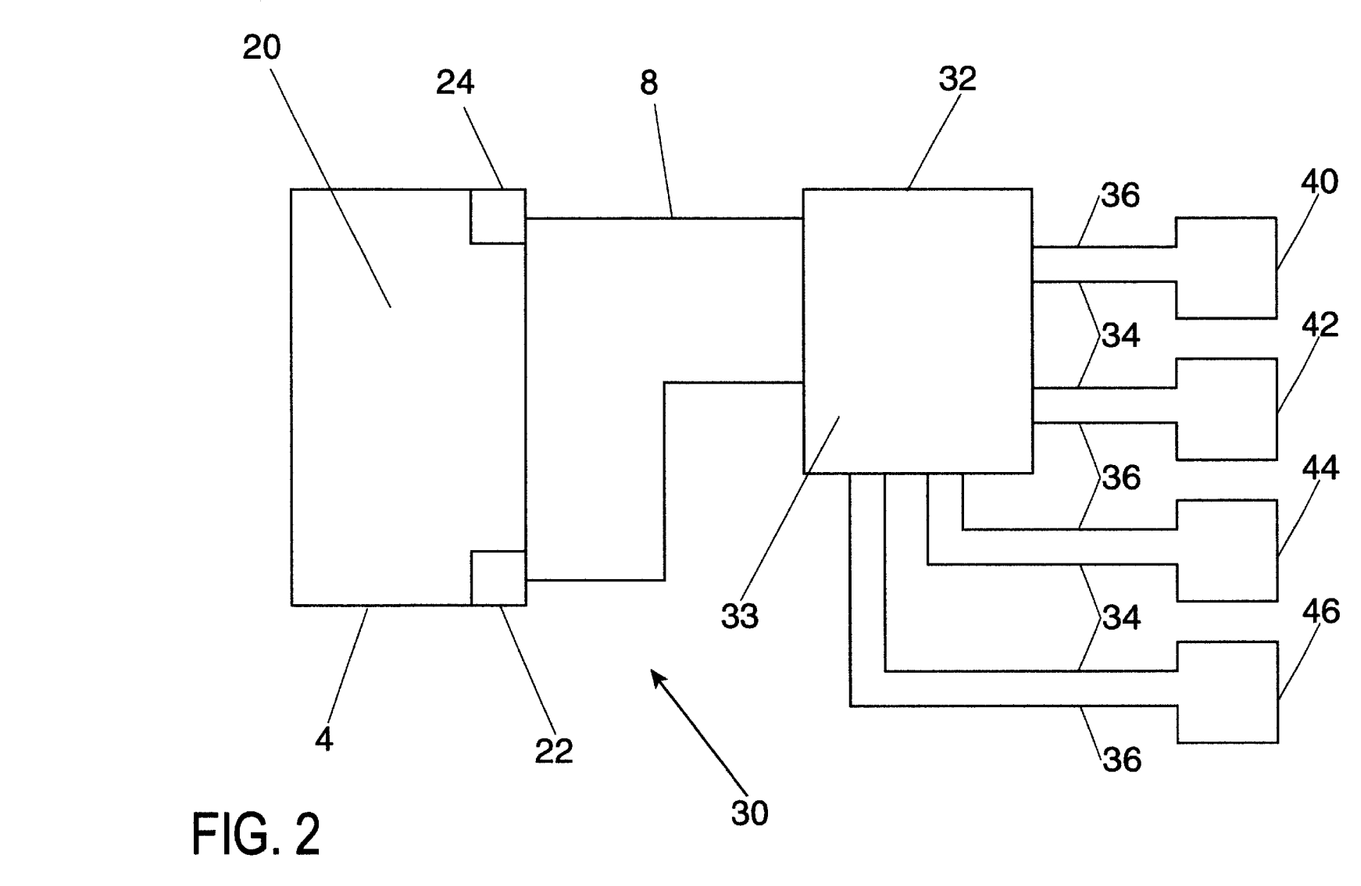
FIG. 2 is a computer arcade game and includes a preferred embodiment of the present invention.

Referring now to FIGS. 2 through 5, and particularly to FIG. 2, a multi-user game arcade system 30 includes a preferred embodiment of the present invention 32, or universal game computer interface 32, the host PC 4 and a plurality of peripheral devices 40, 42, 44 & 46. The universal game computer interface 32, or UGCI 32 and is connected to the host computer 4 via the USB cable 8 to the USB port 24 of the host PC 4. The UGCI includes a UGCI an operating system 33 that enables the UGCI 32 to accept peripheral data packets and signal data, format the received data packets and signal data into HID report descriptors and HID reports, and transmit the HID reports over the USB cable 8 to the host PC 4.

The USB cable 8 provides a pathway for electrical power and communications and control traffic from the host PC 4 to the UGCI 32. The peripheral devices 40, 42, 44 & 46 form the plurality of peripheral devices 18 and are electrically connected to the UGCI 32 by means of a plurality of electrical signal paths 34 and a power lines 36 of a UGCI signal and power network 38.

The host PC 4 includes a Microsoft NT 5.0 operating system software 20, the reset signal input 22 and the USB port 24. The NT 5.0 software 20 contains the Microsoft DirectX multimedia software module and substantively complies with certain HID specifications, as found in "The Device Class Definition for Human Interface Devices, Firmware Specification", Version 1.0—Final, USB Implementer's Forum, 1997.

The plurality of peripheral devices 18 comprises a singular or a combination of suitable input, output and/or bi-directional peripheral devices known in the art, to optionally include an analog input device 40, such as an analog joystick or steering wheel, a digital input device 42, such as a digital joystick, an optical gun or a trackball, a digital credit input device 44, such as a credit card reader, coin counter or paper currency counter, and/or a peripheral out or bi-directional device 46, such as a lamp, a visual indicator, a siren whistle or another suitable output peripheral or suitable bi-directional device known in the art. The UGCI 32 may support as many as 127 peripheral devices.

The UGCI 32 may transmit an input to a reset signal input of the host PC 4 via a watchdog reset line 52 and a watchdog reset line connector 53 as is further described below.

Figure 3:
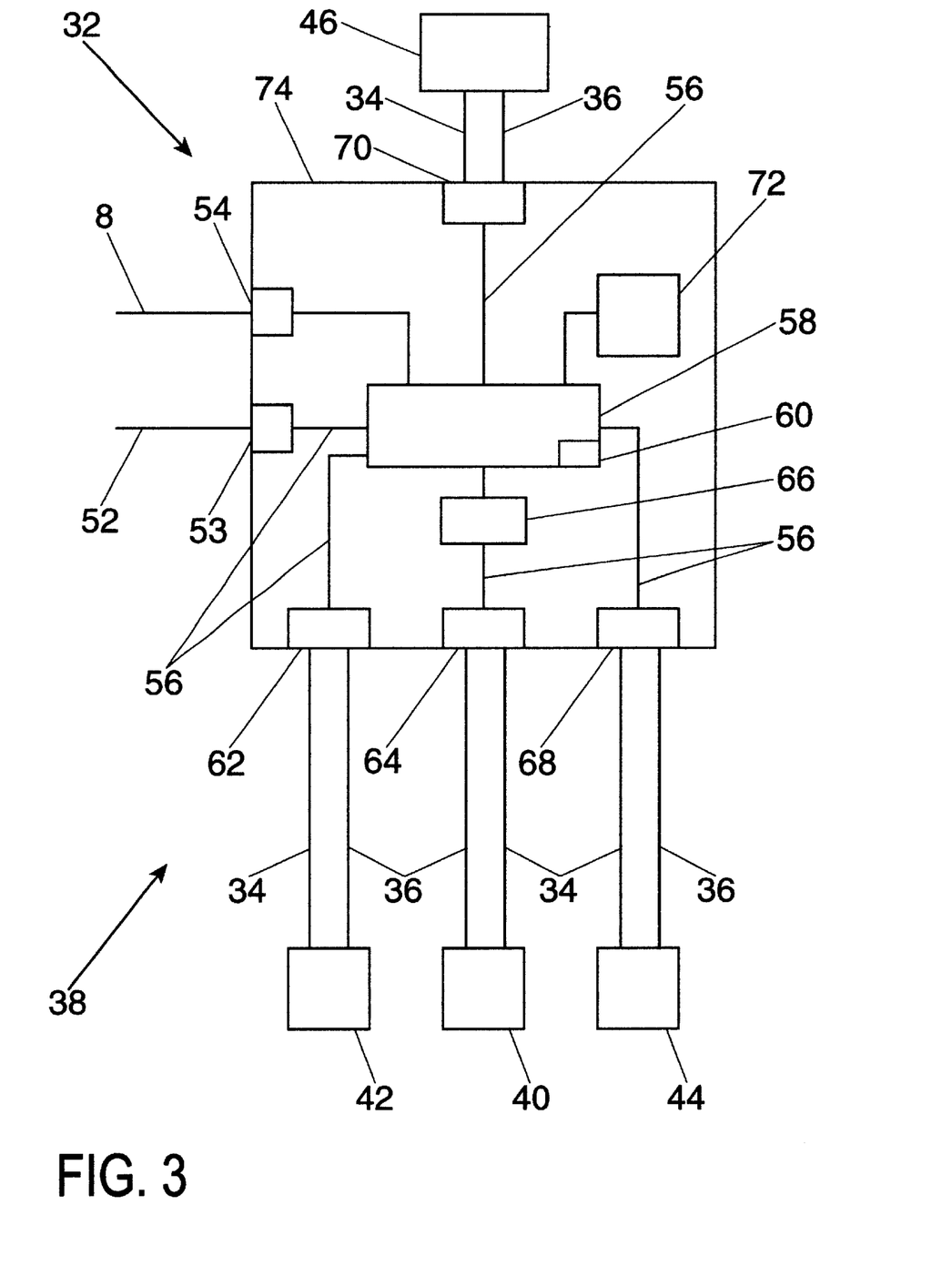
FIG. 3 is an exploded view of the interface control module of FIG. 2.

Referring now to FIGS. 2 through 5, and particularly to FIG. 3, the UGCI 32 includes a USB connector 54, a plurality of parallel and/or serial UGCI signal and power lines 56, an interface controller 58 with a read only memory sector 60, a digital peripheral input device connector 62, an analog input device connector 64, an analog to digital converter IC 66, a digital credit input connector 68, a digital output peripheral connector 70, a non-volatile memory 72 and a printed circuit board 74.

The USB connector 54, the plurality of parallel and/or serial UGCI signal and power lines 56, the interface controller 58, the digital peripheral input device connector 62, the analog input device connector 64, the analog to digital converter IC 66, the digital credit counter connector 68, the digital output peripheral connector 70 and the non-volatile memory 72 are mounted and/or affixed onto the printed circuit board 74, or PCB 74.

The analog to digital converter IC 66, or ADC 66, converts analog data acquired from the analog input peripheral 40, converts that analog data to digital data, and then provides the digital data of the analog input peripheral 40 to the interface controller 58 via the UGCI signal and power lines 56.

The UGCI signal and power lines 56 provide parallel and or serial signal, control, status and power transmission means to and from the individual devices 58, 66 & 72 and connectors 53, 54, 62, 64, 68 & 70. The UGCI signal and power lines 56, the watchdog reset line 52, the signal links 34, the power lines 36 and the USB cable 8 are made of, and/or include, an electrically conductive metal, metal alloy, or other suitable signal or power transmission means known in the art. The electrical power for the UGCI 32 is directed from the host PC 4 over the USB 8 and into the USB connector 54. This electrical power stream is then fed from the USB connector 54 to the interface controller 58 and throughout the UGCI 32 by means of the UGCI signal and power lines 56.

The preferred embodiment may include the following commercially available components: (1.) a Molex 22-23-2061 as a watchdog reset line connector 53 to interface the watchdog reset line 52 to the UGCI 32, (2.) a Molex 22-23-2101 connector as the digital input peripheral connector 62 to interface a trackball of the digital peripheral 42 to the UGCI 32, (3.) a Molex 22-23-2081 connector as the credit peripheral connector 68 to interface a coin-op or a player button of the digital credit input peripheral 44 to the UGCI 32, (4.) a Molex 22-23-2021 connector as the analog input peripheral connector 64 to interface an analog joystick or steering wheel of the analog peripheral 40 to the UGCI 32, (5.) a Molex 22-23-2121 connector as the digital output connector 70 to interface the digital output or bi-directional peripheral 46 to the UGCI 32, (6.) a Newnex Technology URB-1001B as the USB connector 54 to connect the USB cable 8 to the UGCI 32, (7.) a Cypress CY7C63413 USB Processor as the UGCI interface controller 58, (8.) a non-volatile memory CSI CAT35102PI as the memory 72, and (9.) an A/D converter National Semiconductor ADC0838 as the ADC 66.

The non-volatile memory 72, the read only memory sector 60 of the interface controller 58, and the watchdog reset line 52 are all three employed in the recovery of the game arcade system 30 from a crash or from the occurrence of certain other apparent malfunctions. Towards this end, the interface controller 58 continuously monitors the USB 8 for periodic receipt of a refresh message from the host PC 4. Where a refresh signal is not received within a predetermined time, the interface controller 58 is programmed to reset the host PC by transmitting a refresh initiation signal over the watchdog reset line 52 and to the reset input 22 of the host PC 4. The interface controller 58 then proceeds to transmit an authorization key or a serial number value, that has previously been recorded in the read only memory sector 60, to the host PC 4 at an appropriate moment during the recovery of the host PC 4 from the reset command. The delivery of the key or serial number authenticates to the host PC that the UGCI 32 may legitimately and fully interact within the game arcade system 30.

A credit counter value maintained in the non-volatile memory 72 is also provided to the host PC 4 by the interface controller 58 and via the USB 8 at an appropriate moment during the recovery of the host PC 4 from the reset command. The credit counter value is adjusted and stored by the interface controller 58 in the non-volatile memory 72 in response to data received from the credit input device and the host PC 4. The data input from the digital credit input device 44 is communicated to the interface controller 58 via the credit input connector. The transmission of the credit counter value from the non-volatile memory 72 to the host PC 4 during the recovery of the game arcade system 30 from a malfunction or crash of the host PC 4 reduces or eliminates a risk that the game player will suffer an unjust loss of credit due to the occurrence of a malfunction or crash of the host PC 4.

Figure 4:
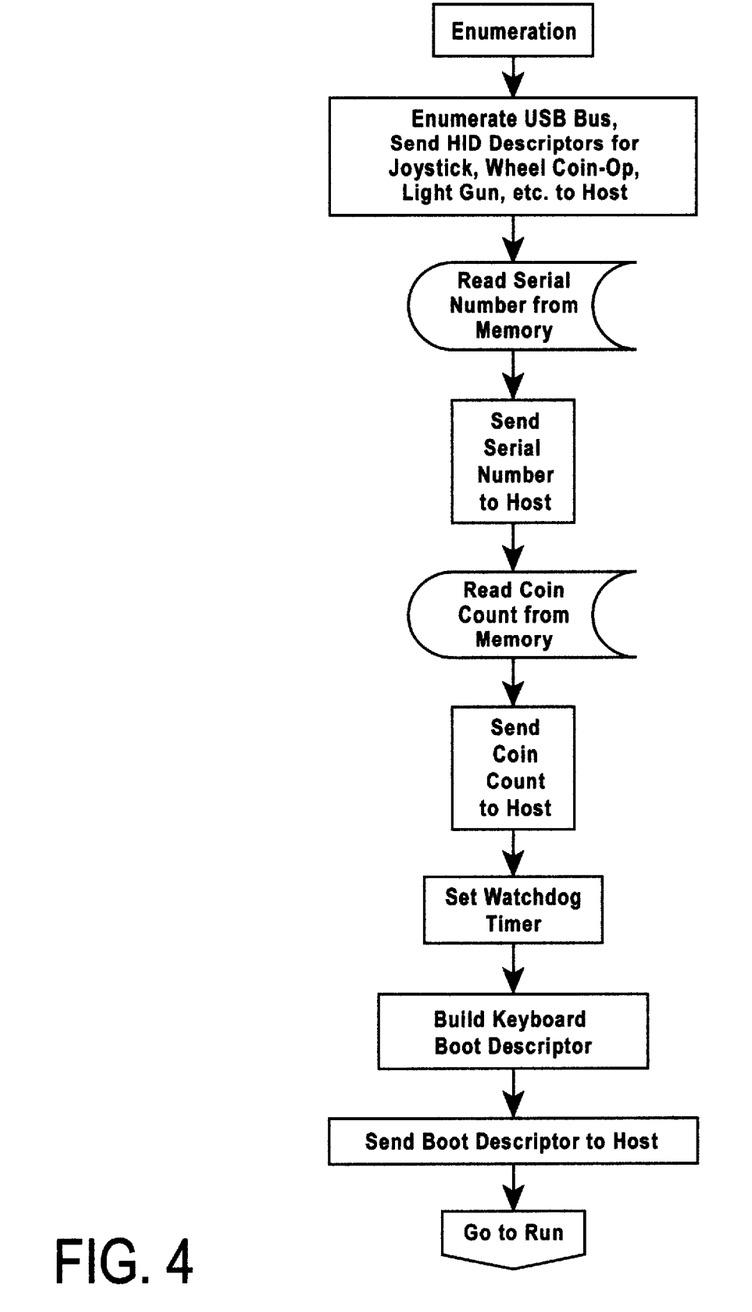
FIG. 4 is a flowchart abstract of the enumeration process of the interface control module of FIG. 3.

Referring now generally to FIGS. 2 through 5 and particularly to FIG. 4, the UGCI 54 initiates certain interactions with the host PC 4 by executing an enumeration process cycle, wherein the interface controller 58 transmits HID descriptors corresponding to each peripheral device 40, 42, 44 & 46 to the host PC 4. The UGCI 58 also transmits the authorization key or serial number value of the read only memory sector 60 to the host PC 4 whereby the host PC 4 is assured that the transmitting UGCI 58 is authorized for use within the game arcade system 30. The UGCI then transmits the credit counter value that is stored in the non-volatile memory 72 of the UGCI 32 to the host PC 4.

The credit counter value may be a dynamic parameter that is determined by the software of the game flow and the amount of coins, credits, token or financial currency that a game player has delivered to a coin-op device, a card reader, or other suitable credit, token value or monetary input device known in the art. This transmission of the credit counter value to the host PC 4 from the UGCI 32 is valuable to both the game player and an arcade operator, not shown, as a loss of credit to the game player due to game system malfunctions may be avoided in some cases. This avoidance of credit loss is meaningful to the arcade operator as the game player may be greatly annoyed by a recovery of a game system malfunction that fails to safeguard the game player's credit. The game player may thereafter be less likely to spend his or her money or credit to play the offending game system, or to patronize the arcade.

The enumerator process cycle includes a setting or resetting of the watchdog timing by the interface controller 58.

The UGCI may optionally build a keyboard boot descriptor, in accordance with the HID standard, and transmit the keyboard boot descriptor to the host PC 4. The UGCI 58 thereby to mimics a keyboard to host PC 4, and may be useful by providing a means to transmit alphanumeric data to the host PC 4. The UGCI enumeration process cycle concludes by directing the UGCI 32 to proceed into the run time process cycle.

Figure 5:
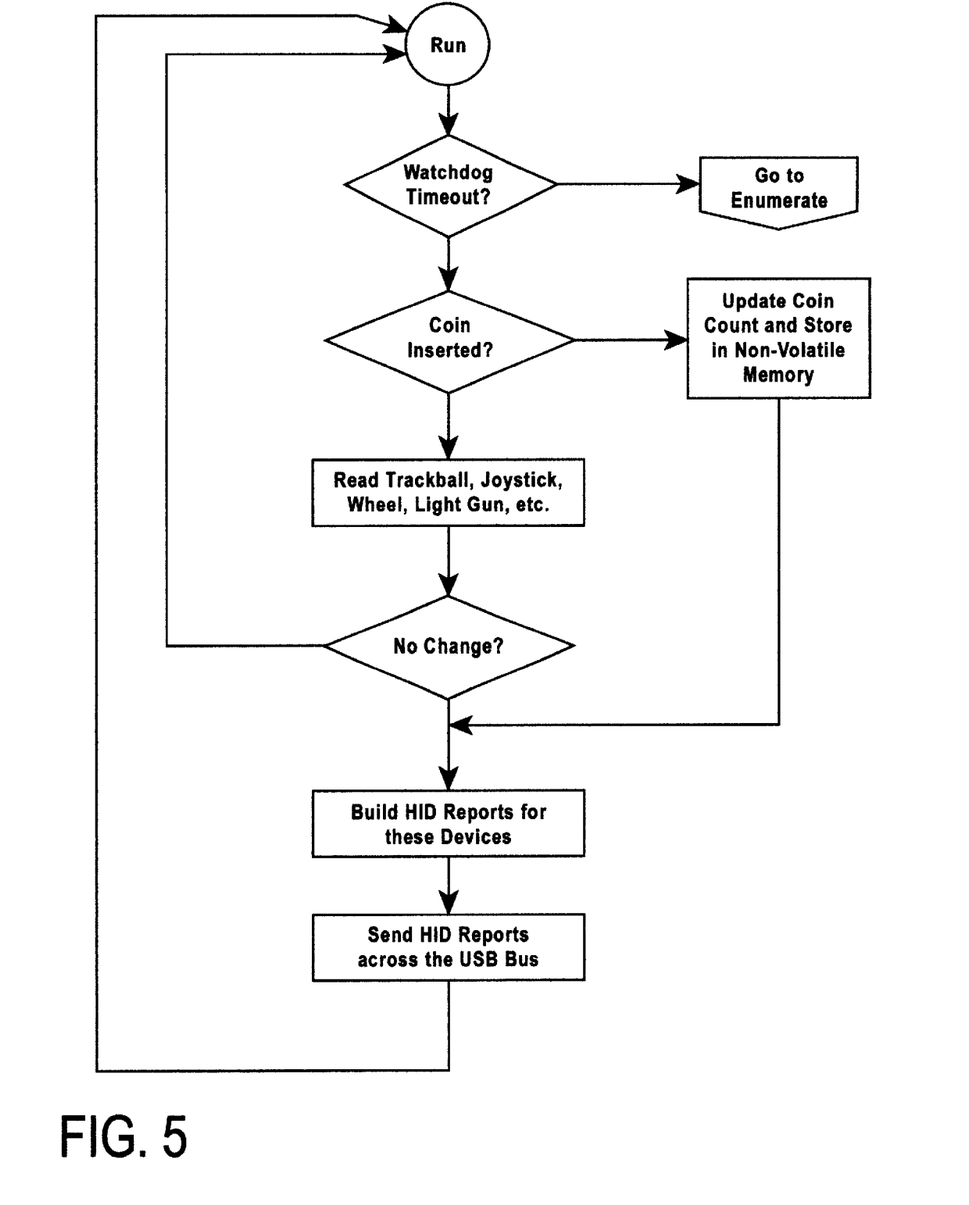
FIG. 5 is a flowchart abstract of the run time process of the interface control module of FIG. 3.

Referring now generally to FIGS. 2 through 5 and particularly FIG. 5, the UGCI 32 in the run time process monitors the USB 8 for the transmission of the watchdog refresh signal from the host PC 4. If a transmission of the refresh signal by host PC 4 is not detected within preset given time period, the UGCI 32 exits the run time behavior process and rests the host PC 4 and initiates enumeration process cycle.

Contrarily, if refresh signals are being properly transmitted from the host PC 4 the UGCI 32, the run time behavior continues and the interface controller 58 polls the credit input peripheral regarding any newly registered coin, credit and/or paper currency submissions by the game player. If a coin, currency or credit input is detected, the credit counter value of the non-volatile memory 72 is incremented. The interface controller 58 next reviews the state of the peripheral devices 40, 42, 44 & 46 and builds and transmits corresponding HID reports when appropriate. The transmissions of the HID reports across the USB 8 allows the game player to engage a game program of the host PC 4.

Referring now generally to the Figures, and particularly to FIGS. 1 and 3, the plurality of peripheral devices 40, 42, 44 & 46 of the multi-user game arcade system 30 are each individually connected to a particular device type specific connector 62, 64, 68 & 70 of the UGCI 32. This effective hard-wiring of a given peripheral device 40, 42, 44 & 46 to the interface controller 58 through a unique and device specific connector 62, 64, 68 & 70 enables the interface controller 58 to presume the archetype of the peripheral device as defined in the HID standard.

The inventive interface design method of the present invention empowers a game system architect to obviate the need for a hub 10 and a plurality of micro-controllers 16, where each micro controller 16 is individually dedicated to a singular peripheral device 18. The employment of the UGCI 32, and the concomitant elimination of the need for the hub 10 and the plurality of micro controllers 16, substantively reduces the cost of components of the multi-user game arcade system 30. The elimination of the plurality of micro controllers 16 in the multi-user game arcade system 30 also reduces the electrical power requirements of the multi-user game arcade system 30. In particular, the capability of the USB 8 to provide up to one half of an amp to the UGCI 32 may allow the UGCI 32 and the plurality of peripheral devices 18 to be powered directly via the power feed from the host PC 4 and via the USB cable 8. The design of the multi-user game arcade system 30 is thus a novel, useful and non-obvious improvement over the prior art.

The capability of the multi-user game arcade system 30 to store, retrieve and transmit a unique serial number to the host PC 4 creates a barrier to unauthorized use of the multi-user game arcade system 30, and reduces the hazards of ownership to the arcade owner by discouraging and making more burdensome the hacking or intrusive manipulation of the multi-user game arcade system or any software stored within.

The capability of the multi-user game arcade system 30 to preserve the credit counter value, and to boot or reboot the host PC 4 after the detection of a crash or other particular malfunctions of the host PC 4 are of immediate value to the arcade owner and the game player, whereby the enjoyment of using a more robust game is made available to the game player, and fewer game players are discouraged from using the multi-user game arcade system 30 due to host PC 4 malfunctions.

In implementation of the UGCI 32, a game designer configures the UGCI 32 to support various peripheral device types 18. The game designer then includes HID report descriptors corresponding to the selected device types 18 in the UGCI operating system 33. Contactor types 62, 64, 68 & 70 are then included in the physical lay-out of the UGCI 32 to enable the detachable or permanent connection of the selected peripheral types 18 to the UGCI 32.

The UGCI 32 is then integrated into the game system 2 by attaching the USB cable 8 to the host PC 4 and optionally connecting the watchdog reset line 52 to the host PC's 4 reset port 22. In addition, one or more peripheral devices 40, 42, 44 & 46 are connected to the pre-installed connectors 62, 64, 68 & 70. Electrical power is provided to the UGCI 32 and the peripheral devices 18, 40, 42, 44 & 46 from the host PC 4 via the USB 8, the signal and power lines 56 of the PCB 74 and the power transmission lines 36.

The value of simplifying the electrical power distribution to the UGCI 32 and the peripheral devices 18, 40, 42, 44 & 46 is a desirable feature of certain preferred embodiments of the method of the present invention.

In operation, the operating system 33 of the UGCI 32 prepares HID report descriptors by relating the type of connector 62, 64, 68 & 70 through which a given peripheral device 18, 40, 42, 44 & 46 is electrically connected to the UGCI 32 to a pre-selected HID report descriptor. More particularly, the game designer might configure the operating system 33 of the interface controller 58 of the UGCI 32 to identify the digital peripheral connector 62 as connecting a digital trackball as the digital input peripheral device 42. The operating system 33 of the UGCI 32 will thereafter identify a peripheral device 18, sensed to be connected to that designated connector 62 to be a digital trackball. The UGCI operating system 33 will thereupon generate a HID trackball report descriptor corresponding to the trackball peripheral 42 and transmit the HID trackball report descriptor to the host PC 4 during the enumeration process cycle. The UGCI operating system 33 thereafter creates trackball HID reports for transmission to the host PC 4 upon the bases of the state data read from the trackball 42 and the HID report formats. The UGCI operating system 33 signifies the origin of the state data of the trackball 42 contained within the HID trackball report to the host PC 4 by identifying each HID trackball report of the trackball 42 as corresponding to the digital input peripheral 42 designated by the preceding HID trackball report descriptor.

The UGCI 32 may further provide the HID report descriptors and the authentication key or UGCI serial number to the host PC 4 during the enumeration cycle. Credit input information, as stored in the non-volatile memory 72, may also be provided during the enumeration process cycle to the host PC 4 when the host PC 4 is responding to a watchdog reset action by the UGCI 32.

The method of the present invention may be applied with non-HID compliant host computers, wherein a system software of the host computer provides the HID report descriptor and HID report functionalities by interpreting the significance of formatted data packets and formatted signal data according to a preestablished communications standard that includes a suitable knowledge-based data communications formatting protocol or technique known in the art.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An interface control module for interfacing a peripheral device and a credit input device to a USB and HID compliant host computer of a game arcade system, the interface control module comprising:

an interface controller, said controller having an operating system that enables receiving electrical signals from peripheral devices and executing HID compliant formatting and USB compliant transmission of HID report descriptors and HID reports, whereby information contained in said electrical signals is communicated to the host computer in HID reports;

a USB cable, said USB cable electrically connecting said controller and the host computer, and providing a USB pathway for transmitting HID report descriptors and HID reports from said interface controller and to the host computer;

a peripheral device connected, said connector providing a transmission pathway to said interface controller and the peripheral device, whereby said interface controller receives electrical signals from the peripheral device, where said peripheral electrical signals contain information describing the state and/or activity of the peripheral device, and said interface controller reformats the said peripheral electrical signals received from the peripheral device into a HID report, and the interface controller transmits a HID report descriptor corresponding to the structure and type of the peripheral device via said USB cable to the host computer and the interface controller transmits said peripheral HID report via said USB cable to the host computer; and a credit input connector, said credit connector providing a transmission pathway from the credit input device to said interface controller, whereby said interface controller receives credit input electrical signals from the credit input device, where said credit input electrical signals contain information describing monetary compensation transferred by a user in return for authority to operate the game arcade system, and said interface controller reformats the credit input electrical signals received from the credit input device into a credit input HID report, and the interface controller transmits a credit input HID report descriptor corresponding to the structure and type of the credit input device via said USB cable to the host computer and the interface controller transmits said credit input HID report via said USB cable to the host computer.

2. The interface control module of claim 1, wherein said peripheral device comprises a digital input device.

3. The interface control module of claim 1, wherein said peripheral device comprises a digital output device.

4. The interface control module of claim 1, wherein the interface control module further comprises a reset signal transmission line, said reset transmission signal transmission line electrically connecting said interface controller to a reset signal input of the host computer, whereby the interface controller may reset the host computer by transmitting a reset signal via said reset signal transmission line and to the reset signal input of the host computer.

5. The interface control module of claim 1, wherein said peripheral device comprises a bi-directional device.

6. The interface control module of claim 1, wherein said peripheral device comprises a digital input device of a set of digital input devices that consists of a digital joystick, an optical gun, a credit card reader, a coin counter, a paper currency counter and a trackball.

7. The interface control module of claim 1, wherein said peripheral device comprises an analog input device of a set of analog input devices that consists of an analog joystick and a steering wheel.

8. A method of interfacing a HID compliant host computer of an arcade game system with a credit input device and a peripheral device through an interface controller, said method comprising:
   a. transmitting peripheral state data from the peripheral device to the interface controller;
   b. formatting the state data in the controller into a HID report;
   c. generating and transmitting a HID report descriptor corresponding to the archetype and structure of the peripheral device to the host computer;
   d. transmitting the HID report from the interface controller to the host computer;
   e. interpreting the HID report descriptor by the host computer in accordance with the HID standard;
   f. interpreting the HID report by the host computer according to the HID standard and the previously interpreted HID report descriptor;
   f.1. transmitting credit information from the credit input device and to the interface controller;
   f.2. formatting the credit information into a credit HID report;
   f.3. generating and transmitting a credit HID report descriptor corresponding to the archetype and structure of the credit input device to the host computer;
   f.4. transmitting the credit HID report from the interface controller to the host computer;
   f.5. interpreting the credit HID report descriptor by the host computer in accordance with the HID standard; and
   f.6. interpreting the credit HID report by the host computer according to the HID standard and the previously interpreted credit HID report descriptor, whereby user is authorized to play the arcade game system according to monetary credit information contained in said credit HID report.

9. The method of claim 8, said method further comprising the steps of:
   g. monitoring of the operation of the host computer by the interface controller;
   h. detecting an operational malfunction of the host computer; and
   i. transmitting a reset signal from the interface controller to the host computer.

10. The method of claim 9, said method further comprising the steps of:
    j. transmitting an authorization key from the interface controller to the host computer; and
    k. determining in the host computer if the authorization key is valid.

11. The method of claim 10, wherein said authorization key is a serial number.

12. The method of claim 9, further comprising the steps of:
    j. transmitting a credit counter value from the interface controller to the host computer; and
    k. integrating the value of the credit counter value into the operation of the host computer.

13. The method of claim 8, further comprising the steps of:
    h. interpreting the state data in the interface controller as data output from a keyboard;
    i. formatting the state data as a HID report from a keyboard;
    i. transmitting a keyboard HID report descriptor to the host computer; and
    j. transmitting the keyboard formatted HID report to the host computer, whereby the peripheral transmits alphanumeric data to the host computer.

* * * * *